: US 7,571,477 B2
(45) Date of Patent: Aug. 4, 2009

(12) United States Patent
Oh et al.

(10) Patent No.

(54) REAL-TIME NETWORK ATTACK PATTERN DETECTION SYSTEM FOR UNKNOWN NETWORK ATTACK AND METHOD THEREOF

(75) Inventors: Jintae Oh, Taejon (KR); Seung Won Shin, Taejon (KR); Ki Young Kim, Taejon (KR); Jong Soo Jang, Taejon (KR); Sung Won Sohn, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 853 days.

(21) Appl. No.: 11/088,975

(22) Filed: Mar. 24, 2005

(65) Prior Publication Data

US 2006/0123480 A1 Jun. 8, 2006

(30) Foreign Application Priority Data

Dec. 7, 2004 (KR) ...................... 10-2004-0102489

(51) Int. Cl.
*G06F 21/00* (2006.01)
(52) U.S. Cl. ............................ 726/23; 726/24; 726/25; 713/188; 713/189; 709/224; 709/225; 709/229
(58) Field of Classification Search .................. 726/23, 726/24; 713/188, 189; 709/224, 225, 229
See application file for complete search history.

(56) References Cited

U.S. PATENT DOCUMENTS 7,134,143 B2 * 11/2006 Stellenberg et al. ........... 726/25

2003/0145225 A1 * 7/2003 Bruton et al. ............... 713/201
2004/0003284 A1 * 1/2004 Campbell et al. ........... 713/201

(Continued)

FOREIGN PATENT DOCUMENTS

KR 1020040008375 1/2004

OTHER PUBLICATIONS

Yu et al., "Gigabit Rate Packet Pattern-Matching Using TCAM", 2004, Proceedings of the 12th IEEE International Conference on Network Protocols (ICNP '04).*

(Continued)

*Primary Examiner*—Tongoc Tran
(74) *Attorney, Agent, or Firm*—Lowe Hauptman Ham & Berner, LLP

(57) ABSTRACT

In a real-time network attack pattern detection system and method, a common pattern is detected in real time from packets, which are suspected to be a network attack such as Worm, to effectively block the attack. The system includes: a suspicious packet detector for classifying a suspicious attack packet from all input packets; a first data delaying unit for receiving the input packet from the suspicious packet detector to output an one-clock delayed data; a second data delaying unit for receiving an output signal from the first data delaying unit to output an one-clock delayed data; a hash key generator for receiving an output data of the suspicious packet detector, an output data of the first data delaying unit and an output data of the second data delaying unit to generate a hash key; a hash table for storing a lookup result obtained by the hash key generated from the hash key generator; and an existence & hit checker for checking the lookup result of the hash table.

11 Claims, 3 Drawing Sheets

U.S. PATENT DOCUMENTS

2004/0098623 A1* 5/2004 Scheidell .................... 713/201
2004/0117478 A1* 6/2004 Triulzi et al. ................ 709/224
2007/0094728 A1* 4/2007 Julisch et al. ................. 726/23

OTHER PUBLICATIONS

Cho et al., "Programmable Hardware for Deep Packet Filtering on a Large Signature Set", 2004, EE Department, University of CA, www.arl.wustl.edu/~young/pub/pac204.pdf.*

Desai N., "Increasing Performance in HIgh Speed NIDS, a look at Snort's Internal", Feb. 2002.*

Hyang-Ah Kim, et al.; "Autograph: Toward Automated, Distributed Worm Signature Detection", 2004.

Lok-Lam Cheng, et al.; "Approximate String Matching in DNA Sequences", Mar. 2003.

\* cited by examiner

REAL-TIME NETWORK ATTACK PATTERN DETECTION SYSTEM FOR UNKNOWN NETWORK ATTACK AND METHOD THEREOF

BACKGROUND OF THE INVENTION

1. Field of the Invention

The present invention relates to a real-time network attack pattern detection system for an unknown network attack and a method thereof, and more particularly, to a real-time network attack pattern detection system and a method thereof in which a common pattern is detected in real time from packets, which are suspected to be a network attack such as Worm, to effectively block the attack.

2. Description of the Related Art

Generally, a method of searching an attacker's internet protocol (IP) address for a network traffic to control an amount of traffic at a corresponding IP address has been mainly used so as to protect a network from an attack. However, the method has a drawback in that a normal traffic cannot be distinguished from the attack traffic. Accordingly, a method of finding a common character pattern from various kinds of packets suspected to be the attack traffic has been suggested. However, this method should perform real-time pattern detection in the attack traffic to detect an unknown attack pattern, thereby blocking interference. Now, this algorithm can be found in a method for detecting a gene base sequence pattern, but there remains a drawback in most of cases in that real-time application is difficult due to a performance defect. Much endeavor is being made to detect and block a new Worm or a Distributed Denial of Service (DDoS) attacking the network, but most of endeavors are being made through an anomaly detection method for detecting the unknown attack. However, it is difficult in the anomaly detection method to accurately detect the attack due to its many false alarms. Accordingly, a research for a method of detecting a traffic abnormal symptom and the like and then directly extracting an attack signature from packets, which are proved to be abnormal, to block intervention is being begun. This research is performed in a manner that the packets of the traffic recognized to be the attack are extracted and then, a common pattern of the packets is detected. However, since an initiation (initiating) position of the common pattern, a length of the pattern or the like is never known in a few packets, much endeavor is required to detect the common pattern. As an endeavor for detecting an unknown constant pattern from pieces of data, a research for detecting a specific alignment from a gene base sequence is being performed. However, these technologies have a disadvantage in that much time is taken. It has been reported that a new Worm paralyzes all network services within three minutes in a current technology. Accordingly, methods for rapidly and easily extracting the common pattern from suspicious packets to previously block a Worm proliferation are required to effectively block a Worm traffic before the Worm paralyzes the network service.

SUMMARY OF THE INVENTION

Accordingly, the present invention is directed to a real-time network attack pattern detection system for an unknown network attack and a method thereof, which substantially obviate one or more problems due to limitations and disadvantages of the related art.

It is an object of the present invention to provide a real-time network attack pattern detection system for an unknown network attack and a method thereof in which an unknown common pattern is detected in real time from attack packets to detect a specific pattern from an unknown Worm or other network attack propagated through a network and the like, thereby effectively blocking the attack.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a real-time network attack pattern detection system for an unknown network attack, the system including: a suspicious packet detector for classifying a suspicious attack packet from all input packets; a first data delaying unit for receiving the input packet from the suspicious packet detector to output an one-clock delayed data; a second data delaying unit for receiving an output signal from the first data delaying unit to output an one-clock delayed data; a hash key generator for receiving an output data of the suspicious packet detector, an output data of the first data delaying unit and an output data of the second data delaying unit to generate a hash key; a hash table for storing a lookup result obtained by the hash key generated from the hash key generator; and an existence & hit checker for checking the lookup result of the hash table.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
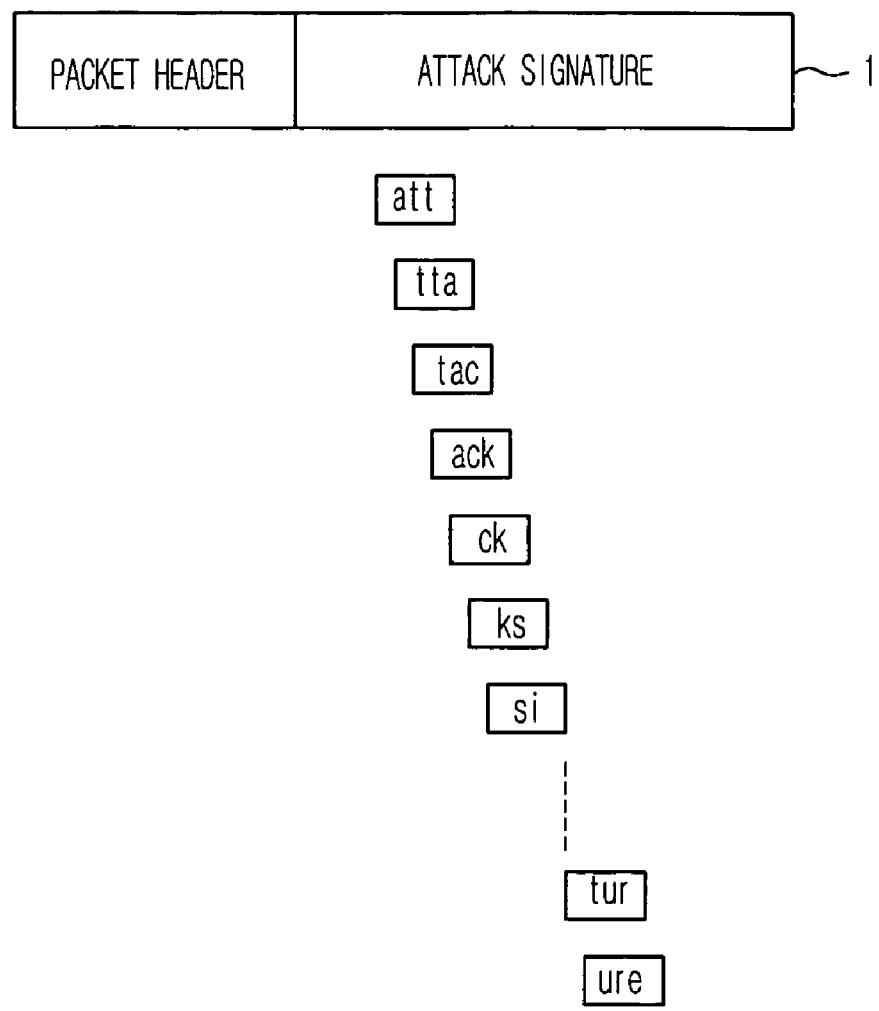
FIG. 1 is a view illustrating an example of a split word search for detecting a common pattern from a packet according to the present invention.

FIG. 1 is a view illustrating an example of a split word search for detecting a common pattern from a packet according to the present invention.

As shown, in a general internet protocol (IP) packet 1, most of traffics such as Worm have a packet header whose specific portion is identical, and a specific pattern of a packet payload. One example for detecting a common portion in the payload is as follows. In case where all character strings are divided and detected by three bytes on the assumption that a character string of "attack signature" is the common portion, a set of small words such as "att", "tta", "tac", "ack", "ck", "ks", "si", ..., "tur" and "ure" can be detected. This just simply embodies as one example and is not limited to that the character string is divided and detected by 3 bytes. Accordingly, any length other than a length of three bytes can provide the same effect, and can be ranged within a scope of the present invention. In other words, in case where this example is embodied in hardware, one byte of data can be inputted every clock and a predetermined length of word can be compared every clock through a lookup unit, thereby detecting each unitary word.

Figure 2:
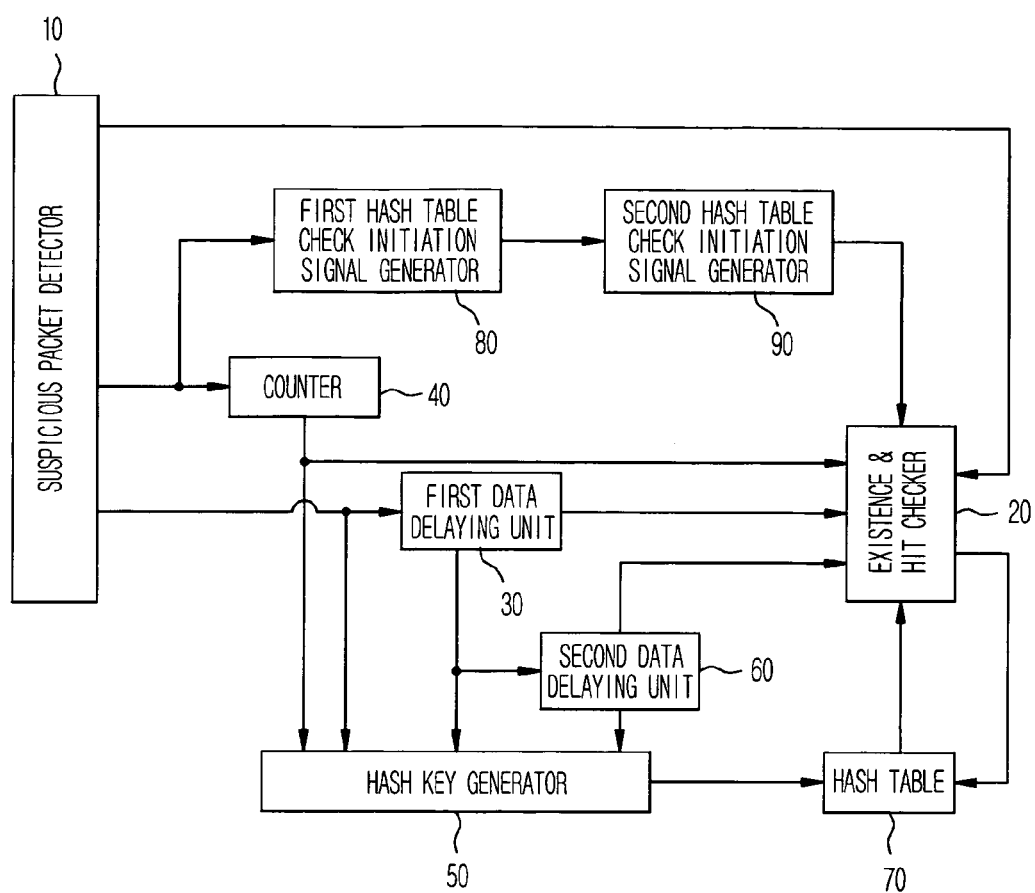
FIG. 2 is a block diagram for generating an unknown attack signature according to a concept of FIG. 1.

FIG. 2 is a block diagram for generating an unknown attack signature according to a concept of FIG. 1.

First, a suspicious packet detector 10 classifies a suspicious attack packet. That is, the suspicious packet detector 10 detects the suspicious packet from all input packets to inform an existence & hit checker 20 of the detected suspicious packet as suspiciousness indication. Further, the suspicious packet detector 10 disables a normal packet as well as the suspicious packet as the suspiciousness indication to input the normal packet to a signature generating block. The normal packet functions as a real-time database for detecting the common pattern, which is commonly included in the attack packet and even the normal packet.

Additionally, a first data delaying unit 30 such as a D-Flip Flop receives the input packet from the suspicious packet detector 10.

Further, a counter 40 receives an input signal from the suspicious packet detector 10. The input signal is a data enable signal for informing that the input data is effective.

The counter 40 counts a sequence of the input data. Generally, the counter 40 refers to a unit for detecting a specific pattern, which in most cases, is generated at a predetermined position of the packet such as Worm. However, even though an output value of the counter 40 is not used according to need at the time of realization, it may not have a difficulty in generating the attack signature.

Additionally, the first data delaying unit 30 receives the input packet from the suspicious packet detector 10 to transmit an output to a hash key generator 50. The output data of the first data delaying unit 30 refers to one-clock delayed data obtained by one-clock delaying the input packet of the first data delaying unit 30.

Further, a second data delaying unit 60 receives the one-clock delayed data from the first data delaying unit 30 to transmit an output data to the hash key generator 50. The output data of the second data delaying unit 60 refers to one-clock delayed data obtained by one-clock delaying the output data of the first data delaying unit 30.

Furthermore, the hash key generator 50 generates a hash key for a hash table 70, and prevents a collision of the hash key. The hash key generator 50 basically receives the output data of the suspicious packet detector 10, the output data of the first data delaying unit 30, and the output data of the second data delaying unit 60, to generate the hash key. Further, a count value of the counter 40 can be also used for generating the hash key.

Herein, the input data of the hash key generator 50 is expressed, as shown in FIG. 1, using the character string of a total of three characters. The three characters include a current-clock character and two previous-clock characters. Accordingly, it can be appreciated that the input data is a hash value for a word of the three-character string.

In other words, the hash key generated from the hash key generator 50 reads a record content from a lookup table through a hash table lookup of the hash table 70. A lookup result of the hash table 70 is checked in an existence & hit checker 20. Herein, the existence & hit checker 20 basically compares the output data of the first data delaying unit 30 with the output data of the second data delaying unit 60. In case where the count value of the counter 40 is used, the count value can be also compared in the existence & hit checker 20.

Further, the hash table 70 looked-up by one hash value generated at the hash key generator 50 can include at least one count for confirming a frequency of the word. The count values are checked in the existence & hit checker 20 to recognize whether or not a corresponding lookup element is in use, thereby automatically updating the lookup table.

Additionally, first and second hash table check initiation signal generators 80 and 90 generate a signal for initiating a hash table check in synchronization with the delayed data of the data enable signal using the data delaying units 30 and 60.

Figure 3:
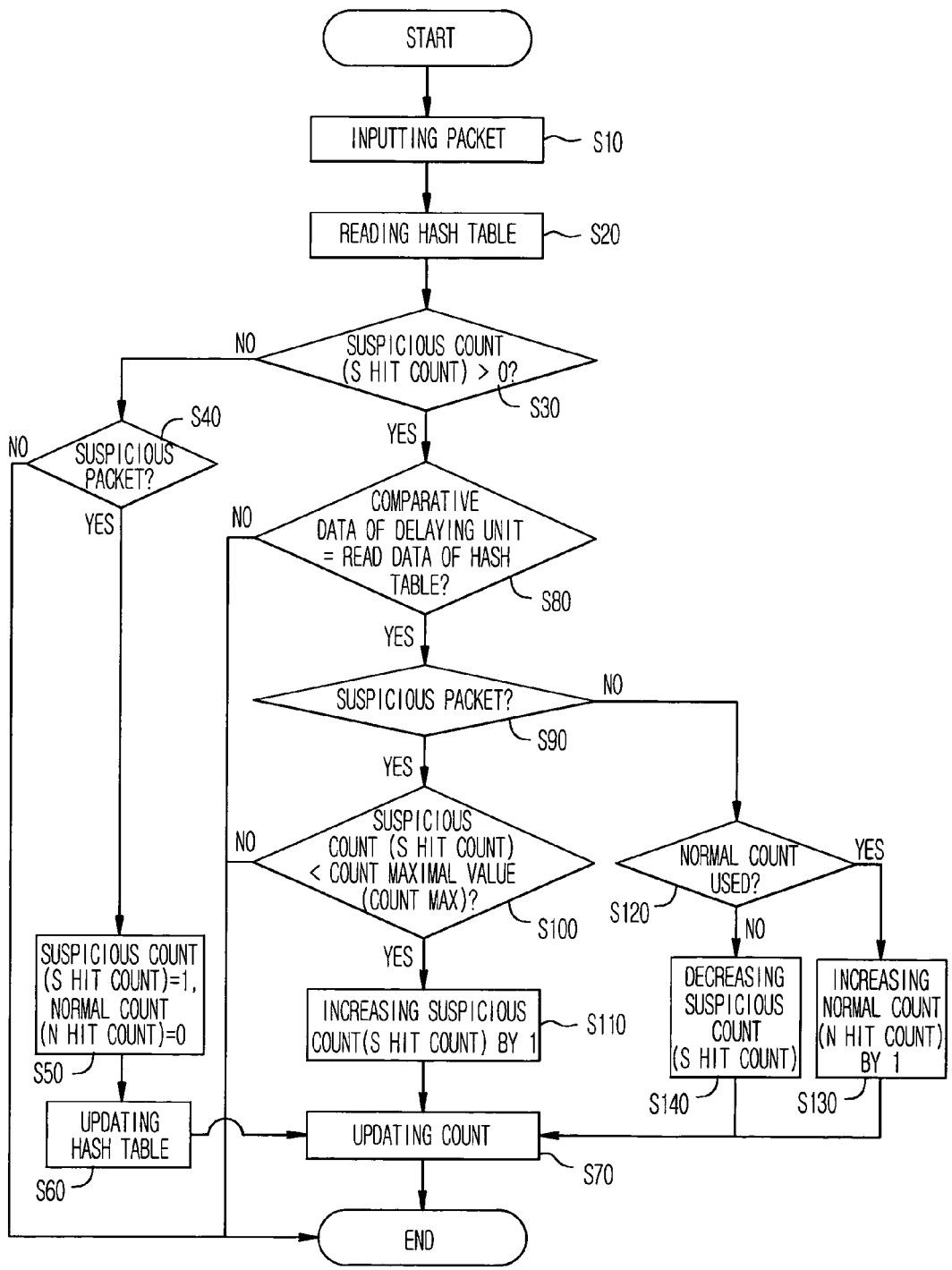
FIG. 3 is a flowchart illustrating a process of generating an unknown attack signature according to the present invention.

FIG. 3 is a flowchart illustrating a process of generating the unknown attack signature according to the present invention.

As shown, the packet is inputted (S10), and the hash value is generated to read the hash table (S20). Herein, the data obtained by reading the hash table can have at least one count at each hash address. In the present invention, each of operations performed in cases where the hash table has only one count and two counts at each address will be described.

Next, it is determined whether or not a suspicious count (s hit count) is greater than zero (S30). If the suspicious count (s hit count) is zero, it is represented that the suspicious count (s hit count) is a non-use area. Therefore, a suspicious packet indication is checked (S40). In case where the suspicious packet indication is the normal packet, a process is ended and a next packet is waited. To the contrary, if the suspicious packet indication is the suspicious packet, the suspicious count (s hit count) is initialized to "1" and the normal count (n hit count) is initialized to "0" (S50). After that, a corresponding area of the hash table is updated (S60). After the increased counts are updated (S70), the process is ended.

Meanwhile, if it is determined in the step (S30) that the suspicious count (s hit count) is not zero, it is represented that the corresponding area of the hash table has been already accessed once or more. At this time, a value stored in a corresponding entry of the hash table is read and compared with values of the data delaying units 30 and 60 (S80). At this time, the output value of the counter 40 can be also added for comparison.

Next, in case where the compared result values are not identical, it is represented that the corresponding area of the hash table is already in use. Further, a multi hash table can be also used to avoid the hash collision. In this case, at least one hash table can be also concurrently accessed by the same hash value.

However, in case where the compared result values are identical, it is represented that the lookup result of the hash table is already registered in the hash table. Therefore, it is checked whether the lookup result is data of the suspicious packet or data of the normal packet (S90). If the lookup result is the suspicious packet data, it is checked whether or not the suspicious count (s hit count) is greater than a count maximal value (count max) (S100). As a comparative result, if it is determined that the suspicious count (s hit count) is greater than the count maximal value (count max), the process is ended. If the suspicious count (s hit count) is not greater than the count maximal value (count max), only the suspicious count (s hit count) is increased by 1 (S110) to update the count (S70).

Meanwhile, if the lookup result is not the suspicious packet data in the step S90, it is represented that the corresponding area of the hash table is hit in the normal packet. Therefore, it is checked whether or not the normal count is used (S120). In case where the normal count is used, the normal count (n hit count) is increased by 1 (S130) to update the count (S70). In case where the normal count is not used, the suspicious count (s hit count) is decreased (S140) to update the count (S70).

In other words, in case where the normal count (n hit count) is used, the suspicious count (s hit count) and the normal count (n hit count) of an area of the corresponding hash value are resultantly compared with each other to generate the signature. In case where the normal counter (n hit count) is not used, greater portions of the suspicious count (s hit count) than zero are detected and used for generating the signature.

Further, the count value of the counter 40 of FIG. 2 is recorded in the table and used for detecting a longer sentence from each word. The hash table is used in the example of FIGS. 2 and 3. Of course, a cam and the like can be used as the lookup table.

As a result, after the suspicious packet detector 10 of FIG. 2 detects the suspicious packet or a suspicious flow, it receives the packet for a predetermined period. The table is automatically updated according to the flowchart of FIG. 3. After a predetermined time, each of the stored data is read from the hash table 70. If so, the count values and data can be read from the hash table. The specific pattern used only for the suspicious packet can be detected in real time from the read values using the initiation position of each word and the count value.

The inventive real-time network attack pattern detection method for the unknown network attack can be programmed for a computer and stored in a recording medium such as a hard disc, a floppy disc, a magneto-optical disc, CD-ROM, ROM, RAM and the like.

As described above, in the present invention, the unknown common pattern can be detected in real time from the attack packets to detect the specific pattern from the Worm attack and the like, which are propagated through the network, thereby effectively blocking the attack.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A real-time network attack pattern detection system for an unknown network attack, the system comprising:
    a suspicious packet detector for classifying a suspicious attack packet from all input packets;
    a first data delaying unit for receiving the input packet from the suspicious packet detector to output an one-clock delayed data;
    a second data delaying unit for receiving an output signal from the first data delaying unit to output an one-clock delayed data;
    a hash key generator for receiving an output data of the suspicious packet detector, an output data of the first data delaying unit and an output data of the second data delaying unit to generate a hash key;
    a hash table for storing a lookup result obtained by the hash key generated from the hash key generator; and
    an existence and hit checker for checking the lookup result of the hash table.

2. The system of claim 1, further comprising a counter for receiving an input signal, which informs that an input data is effective, from the suspicious packet detector.

3. The system of claim 2, wherein the existence and hit checker compares an output value of the first data delaying unit, an output value of the second data delaying unit, and an output value of the counter.

4. The system of claim 1, wherein the hash table has at least one count for confirming a frequency of a word.

5. A real-time network attack pattern detection method for an unknown network attack, the method comprising:
    classifying an input packet as a suspicious packet or a normal packet;
    delaying the input packet to obtain first one-clock delayed data;
    delaying the first one-clock delayed data to obtain second one-clock delayed data;
    generating a hash key from the input packet and the first and second one-clock delayed data;
    using the generated hash key as a hash address to obtain a corresponding lookup result from a hash table;
    checking the lookup result received from the hash table, wherein
    where the lookup result indicates no previous suspicious packet at said hash address in the hash table and where said classifying confirms that the input packet is a suspicious packet,
        increasing a suspicious packet count; and
        updating the hash table with the increased suspicious packet count.

6. The method of claim 5, wherein where the lookup result indicates a previous suspicious packet at said hash address in the hash table and where said classifying confirms that the input packet is a normal packet, a normal packet count is increased.

7. The method of claim 5, wherein where the lookup result indicates a previous suspicious packet at said hash address in the hash table and where said classifying confirms that the input packet is a normal packet, the suspicious packet count is decreased without changing a normal packet count.

8. A real-time network attack pattern detection system for an unknown network attack, the system comprising:
    a suspicious packet detector for classifying an input packet as a suspicious packet or a normal packet;
    a first data delaying unit for delaying the input packet to obtain first one-clock delayed data;
    a second data delaying unit for delaying the first one-clock delayed data to obtain second one-clock delayed data;
    a hash key generator for generating a hash key from the input packet and the first and second one-clock delayed data;
    a hash table for storing a lookup result obtainable by the hash key generated by the hash key generator; and
    an existence and hit checker for checking the lookup result received from the hash table.

9. The system of claim 8, further comprising
    a counter for receiving an input signal, which informs that input data is effective, from the suspicious packet detector.

10. The system of claim 9, wherein the existence and hit checker compares an output value of the first data delaying unit, an output value of the second data delaying unit, and an output value of the counter.

11. The system of claim 8, wherein the hash table has at least one count for confirming a frequency of a word.

* * * * *